US012695022B2

(12) United States Patent
Yoshioka et al.

(10) Patent No.: US 12,695,022 B2

(45) Date of Patent: Jul. 28, 2026

(54) INDUCTOR COMPONENT AND METHOD OF MANUFACTURING SAME

(71) Applicant: Murata Manufacturing Co., Ltd., Kyoto-fu (JP)

(72) Inventors: Yoshimasa Yoshioka, Nagaokakyo (JP); Kouji Yamauchi, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 1005 days.

(21) Appl. No.: 17/653,607

(22) Filed: Mar. 4, 2022

(65) Prior Publication Data

US 2022/0301758 A1 Sep. 22, 2022

(30) Foreign Application Priority Data

Mar. 17, 2021 (JP) ................................ 2021-043905

(51) Int. Cl.
*H01F 27/28* (2006.01)
*H01F 1/06* (2006.01)

(52) U.S. Cl.
CPC ......... *H01F 27/2804* (2013.01); *H01F 1/061* (2013.01); *H01F 27/2847* (2013.01)

(58) Field of Classification Search
CPC ............... H01F 27/2804; H01F 27/255; H01F 2027/2809; H01F 2027/2819; H01F 27/022; H01F 27/00; H01F 27/266; H01L 23/5227; H05K 1/111; H05K 1/165; H05K 2201/086
See application file for complete search history.

(56) References Cited

U.S. PATENT DOCUMENTS

2009/0002117 A1* 1/2009 Kawarai ............. H01F 17/0006 336/233
2009/0243780 A1* 10/2009 Inoue .................... H01L 23/645 336/200

(Continued)

FOREIGN PATENT DOCUMENTS

CN 110136921 A 8/2019
CN 111837205 A 10/2020

(Continued)

*Primary Examiner* — Mang Tin Bik Lian

(74) *Attorney, Agent, or Firm* — Studebaker Brackett PLLC

(57) ABSTRACT

An inductor component comprising an element body having first and second magnetic layers laminated in order along a first direction; an inductor wire on a plane orthogonal to the first direction between the first and second magnetic layers and including side surfaces facing a direction orthogonal to the first direction; and a side surface insulating part made of a non-magnetic material covering only a part of the side surfaces. The first and second magnetic layers each include a flat magnetic powder and a resin containing the magnetic powder. The first magnetic layer exists in a direction opposite to the first direction with respect to the inductor wire. The second magnetic layer exists in the first direction and in a direction orthogonal to the first direction. The side surface insulating part is made of a material that is the same as that of the resin of the second magnetic layer.

18 Claims, 13 Drawing Sheets

(56) References Cited

U.S. PATENT DOCUMENTS

| | | | | |
|---|---|---|---|---|
| 2010/0201473 | A1* | 8/2010 | Konoue | H01F 5/00 336/200 |
| 2013/0249664 | A1* | 9/2013 | Tonoyama | H01F 17/0013 336/200 |
| 2014/0167897 | A1* | 6/2014 | Choi | H01F 41/046 336/83 |
| 2016/0099098 | A1* | 4/2016 | Yamaguchi | H01F 17/04 336/221 |
| 2017/0004915 | A1* | 1/2017 | Park | H01F 27/255 |
| 2017/0178789 | A1* | 6/2017 | Kim | H01F 27/2804 |
| 2018/0075965 | A1* | 3/2018 | Yoshioka | H01F 27/2823 |
| 2018/0166194 | A1* | 6/2018 | Choi | H01F 5/04 |
| 2019/0062883 | A1* | 2/2019 | Lin | H01F 17/04 |
| 2019/0180927 | A1* | 6/2019 | Moon | H01F 17/0013 |
| 2019/0244743 | A1* | 8/2019 | Hirai | H01F 41/12 |
| 2022/0165472 | A1* | 5/2022 | Okumura | H01F 27/255 |

FOREIGN PATENT DOCUMENTS

| | | | |
|---|---|---|---|
| JP | 2016-122836 | A | 7/2016 |
| JP | 2019-075478 | A | 5/2019 |
| JP | 2019-134141 | A | 8/2019 |
| JP | 2019-140202 | A | 8/2019 |
| JP | 2020-013854 | A | 1/2020 |
| WO | 2019/177078 | A1 | 9/2019 |
| WO | 2020/183993 | A1 | 9/2020 |

* cited by examiner

INDUCTOR COMPONENT AND METHOD OF MANUFACTURING SAME

CROSS REFERENCE TO RELATED APPLICATION

This application claims benefit of priority to Japanese Patent Application 2021-043905, filed Mar. 17, 2021, the entire content of which is incorporated herein by reference.

BACKGROUND

Technical Field

The present disclosure relates to an inductor component and a method of manufacturing the same.

Background Art

Up until now, as inductor components there have been ones described in JP2016-122836A and JP2019-140202A.

The inductor component described in JP2016-122836A has an inductor wire, a first magnetic body in which the inductor wire is embedded, and a second magnetic body disposed on the upper part and the lower part of the first magnetic body. The first magnetic body includes a substantially spherical magnetic powder. The second magnetic body includes a metal magnetic plate.

The inductor component described in JP2019-140202A has an inductor wire, a first magnetic body in which the inductor wire is embedded, and a second magnetic body disposed on the upper part and the lower part of the first magnetic body. The first magnetic body includes a substantially spherical magnetic powder. The second magnetic body includes a flat magnetic powder.

SUMMARY

By the way, the conventional inductor component uses the substantially spherical magnetic powder in the first magnetic body where the inductor wire is embedded, considering insulation and filling properties. For this reason, the first magnetic body has a lower magnetic permeability and insufficient inductance acquisition efficiency, as compared to the second magnetic body including the metal magnetic plate or the flat magnetic powder.

Therefore, the present disclosure provides an inductor component and a method of manufacturing the same, capable of improving the inductance acquisition efficiency while ensuring the insulation and filling properties.

An inductor component as an aspect of the present disclosure comprises an element body having a first magnetic layer and a second magnetic layer that are laminated in order along a first direction; an inductor wire arranged on a plane orthogonal to the first direction between the first magnetic layer and the second magnetic layer, the inductor wire including side surfaces facing a direction orthogonal to the first direction; and a side surface insulating part made of a non-magnetic material covering only a part of the side surfaces of the inductor wire. The first magnetic layer and the second magnetic layer each include a flat magnetic powder and a resin containing the magnetic powder. The first magnetic layer exists in a direction opposite to the first direction with respect to the inductor wire. The second magnetic layer exists in the first direction and in a direction orthogonal to the first direction. The side surface insulating part is made of a material that is the same as that of the resin of the second magnetic layer.

Here, “the side surface insulating part covers only a part of the side surfaces of the inductor wire” includes not only the state where the side surface insulating part is in contact with only a part of the side surfaces of the inductor wire, but also the state where an other member exists between the side surface insulating part and a part of the side surfaces of the inductor wire such that the side surface insulating part together with the other member cover only a part of the side surfaces of the inductor wire.

According to the embodiment, since the first magnetic layer and the second magnetic layer include the flat-shaped magnetic powder, a high relative magnetic permeability can be obtained due to lowered demagnetic field. The inductor wire is arranged between the first magnetic layer and the second magnetic layer, the first magnetic layer exists in a direction opposite to the first direction of the inductor wire, and the second magnetic layer exists in the first direction of the inductor wire and in a direction orthogonal to the first direction, with the result that the flat-shaped magnetic powder can be arranged around the first inductor wire. This improves the filling rate of the flat magnetic powder to enable improvement in the magnetic permeability around the first inductor wire, achieving improvement in the inductance acquisition efficiency.

Since the side surface insulating part covers only a part of the side surfaces of the inductor wire, for example, even though a plurality of magnetic powders are electrically coupled in a direction orthogonal to the first direction, a part of the side surfaces of the inductor wire is not in contact with the magnetic powders due to the side surface insulating part. As a result, the insulation property can be improved. Since the side surface insulating part is made of a material that is the same as that of the resin of the second magnetic layer, the residual stress in the element body can be reduced.

Preferably, in an embodiment of the inductor component, a part of the inductor wire is in contact with the magnetic powder.

According to the embodiment, by eliminating unnecessary insulating parts, the inductance acquisition efficiency can be improved.

Preferably, in an embodiment of the inductor component, the inductor wire includes a bottom surface facing a direction opposite to the first direction. The inductor component further comprises a bottom surface insulating part that is in contact with the bottom surface.

According to the embodiment, the bottom surface of the inductor wire is not in contact with the magnetic powder of the first magnetic layer due to the bottom surface insulating part. This can improve the insulation property.

Preferably, in an embodiment of the inductor component, in a section orthogonal to a direction where the inductor wire extends, an angle formed by a longitudinal axis of the flat magnetic powder included in the first magnetic layer with respect to the bottom surface is 45° or less.

Here, the longitudinal axis of the magnetic powder is a straight line passing through the longest portion of the magnetic powder. The angle formed by the longitudinal axis of the magnetic powder with respect to the bottom surface is derived by: acquiring an SEM image in a section orthogonal to an extended direction of the inductor wire; binarizing the SEM image; and measuring an angle at which the longitudinal axis of the magnetic powder and the bottom surface of the inductor wire intersect, with white and black representing the magnetic powder and the resin, respectively.

According to the embodiment, since the angle θ formed by the longitudinal axis of the magnetic powder with respect to the bottom surface is 45° or less, the longitudinal axis of the magnetic powder is arranged substantially parallel to the bottom surface of the inductor wire. For this reason, the arrangement of the magnetic powder becomes parallel to the magnetic flux, so that a high relative magnetic permeability can be obtained.

Preferably, in an embodiment of the inductor component, the side surface insulating part is in contact with the bottom surface insulating part.

According to the embodiment, the corner between the side surface and the bottom surface of the inductor wire can be covered with the side surface insulating part and the bottom surface insulating part, enabling the insulation property to be further improved. That is, in the first magnetic layer, the longitudinal axis of the magnetic powder is arranged substantially parallel to the bottom surface of the inductor wire, whereby even though the plurality of magnetic powders are electrically coupled in a direction orthogonal to the first direction, the corner of the inductor wire is not in contact with the magnetic powders due to the side surface insulating part and the bottom surface insulating part.

Preferably, in an embodiment of the inductor component, the side surface insulating part differs in composition from the bottom surface insulating part.

According to the embodiment, the design range of the side surface insulating part and the bottom surface insulating part is widened. For example, by selecting for the bottom surface insulating part a resin with high intimate adhesion to the inductor wire, the reliability of the inductor component can be enhanced. By selecting for the side surface insulating part a resin with stress-relieving properties (e.g. coefficient of thermal expansion and Young's modulus), the overall residual stress of the inductor component can be relieved.

Preferably, in an embodiment of the inductor component, the inductor wire includes a top surface facing the first direction. The inductor component further comprises a peripheral surface insulating part that is in contact with the side surface and the top surface. The peripheral surface insulating part differs in composition from the side surface insulating part and from the bottom surface insulating part, and the side surface insulating part has a thickness that is greater than that of the peripheral surface insulating part.

Here, the thickness refers to a maximum value measured in a section orthogonal to the extended direction of the inductor wire.

According to the embodiment, the insulation property can be further improved.

Preferably, in an embodiment of the inductor component, the side surface insulating part has a height in the first direction that is one-half or less of that of the inductor wire.

Here, the height refers to a value measured in a section orthogonal to the extended direction of the inductor wire.

According to the embodiment, by reducing the height of the side surface insulating part, the volume of the magnetic layer is increased, further improving the inductance acquisition efficiency while ensuring the insulation property.

Preferably, in an embodiment of the inductor component, in a section orthogonal to a direction where the inductor wire extends, the second magnetic layer has a side surface vicinity region defined by the side surface of the inductor wire and a position apart a predetermined distance from the side surface in a direction orthogonal to the first direction, and an angle formed by a longitudinal axis of the flat magnetic powder included in the side surface vicinity region with respect to the side surface is 45° or less.

Here, the side surface vicinity region is a region surrounded by the side surface, the position apart from the side surface by the predetermined distance, an extended surface including the top surface, and an extended surface including the bottom surface. The distance from the side surface of the inductor wire is a distance from the end toward the bottom surface of the side surface of the inductor wire. The predetermined distance is one-third of the width of the inductor wire in the direction orthogonal to the first direction.

According to the embodiment, since the angle formed by the longitudinal axis of the magnetic powder with respect to the side surface is 45° or less, the longitudinal axis of the magnetic powder is arranged substantially parallel to the side surface of the inductor wire in the side surface vicinity region. For this reason, the magnetic powder and the resin are alternately arranged along the direction orthogonal to the first direction in the side surface vicinity region, making it possible to ensure the insulation property while keeping the inductance acquisition efficiency.

Preferably, in an embodiment of the inductor component, in a section orthogonal to a direction where the inductor wire extends, an angle formed by a longitudinal axis of the flat magnetic powder included in the second magnetic layer with respect to the side surface increases according as moving away from the side surface of the inductor wire in a direction orthogonal to the first direction.

Here, increase in the angle formed by the longitudinal axis of the magnetic powder with respect to the side surface refers to that the angle varies from 0° toward 90°.

According to the embodiment, since in the vicinal region of the side surface of the inductor wire, the longitudinal axis of the magnetic powder is arranged substantially parallel to the side surface, the magnetic powder and the resin are alternately arranged along the direction orthogonal to the first direction, making it possible to ensure the insulation property while keeping the inductance acquisition efficiency.

Preferably, in an embodiment of the inductor component, when a main surface of the second magnetic layer in the first direction is viewed from a direction orthogonal to the main surface of the second magnetic layer, the second magnetic layer has an overlapping region overlapping with the inductor wire and a non-overlapping region not overlapping with the inductor wire, and at least a part of the non-overlapping region is lower in brightness than the overlapping region.

According to the embodiment, on the main surface of the second magnetic layer, the area directly above the overlapping region looks bright, whereas the area directly above at least a part of the non-overlapping region looks dark. This makes it possible to confirm that the magnetic powder included in the second magnetic layer is in a desired arrangement when pressure bonding the second magnetic layer to the inductor wires for manufacture. Specifically, it can be determined that the longitudinal axis of the magnetic powder included in the overlapping region is arranged substantially parallel to the main surface of the second magnetic layer and that the longitudinal axis of the magnetic powder included in at least a part of the non-overlapping region is arranged along the direction substantially orthogonal to the main surface of the second magnetic layer. Accordingly, poor filling of the magnetic powder can be detected non-destructively.

Preferably, in an embodiment of the inductor component, in a section orthogonal to a direction where the inductor wire extends at a center of the inductor wire in the direction where the inductor wire extends, when a maximum ferret length of the magnetic powder is LF and a thickness orthogonal to the maximum ferret length of the magnetic powder is TF, LF/TF≥10 holds, D90 of the maximum ferret length being 100 μm or less.

Here, D90 of the maximum ferret length is found by acquiring about three SEM images in the above section within the region of 200 μm×200 μm and calculating D90 thereof.

According to the above configuration, due to LF/TF≥10, the flatness of the magnetic powder can be increased, thereby making it possible to obtain a higher relative magnetic permeability.

Since D90 of the maximum ferret length is 100 μm or less, the insulation property can be ensured. For example, if the maximum ferret length is too large, there is a high possibility of a short circuit via the magnetic powder between different inductor wires or between laps of the same inductor wire.

Preferably, in an embodiment of the inductor component, the first magnetic layer and the second magnetic layer each have a void ratio of 1 vol % or more and 10 vol % or less (i.e., from 1 vol % to 10 vol %).

According to the embodiment, since the void ratio is 1 vol % or more, the voids can relieve stress from residual stress and external stress. Since the void ratio is 10 vol % or less, a decrease in inductance and a reduction in strength of the element body can be suppressed.

Preferably, an embodiment of a method of manufacturing an inductor component comprises the steps of forming an inductor wire on a main surface of a base substrate; and forming a side surface insulating part by pressure bonding a magnetic sheet including a flat magnetic powder and a resin containing the flat magnetic powder from above a main surface of the base substrate to the inductor wire, to cover a top surface and side surfaces of the inductor wire with the magnetic sheet, and simultaneously by extruding the resin included in the magnetic sheet from the magnetic sheet so as to cover only a part of the side surfaces of the inductor wire. The base substrate has a hardness higher than that of the magnetic sheet.

According to the embodiment, since the hardness of the base substrate is higher than the hardness of the magnetic sheet, when pressure bonding the magnetic sheet to the inductor wires, the resin included in the magnetic sheet can be effectively extruded to only a part of the side surfaces of the inductor wires. Thus, the side surface insulating part can be effectively formed simultaneously with the pressure bonding of the magnetic sheet.

Preferably, an embodiment of the method of manufacturing an inductor component further comprises the step of covering a bottom surface of the inductor wire with an other magnetic sheet by removing the base substrate after the step of forming the side surface insulating part and then by pressure bonding the other magnetic sheet from below the inductor wire to the inductor wire.

According to the embodiment, the inductor wires can be sandwiched by the upper and lower magnetic sheets, enabling improvement in the inductance acquisition efficiency.

According to the inductor component and the method of manufacturing the same that are aspects of the present disclosure, the inductance acquisition efficiency can be improved while ensuring the insulation and filling properties.

DETAILED DESCRIPTION

An inductor component and its manufacturing method as one aspect of the present disclosure will hereinafter be described in detail based on embodiments shown. The drawings partly include schematic ones and may not reflect actual dimensions or ratios.

First Embodiment

Configuration

Figure 1:
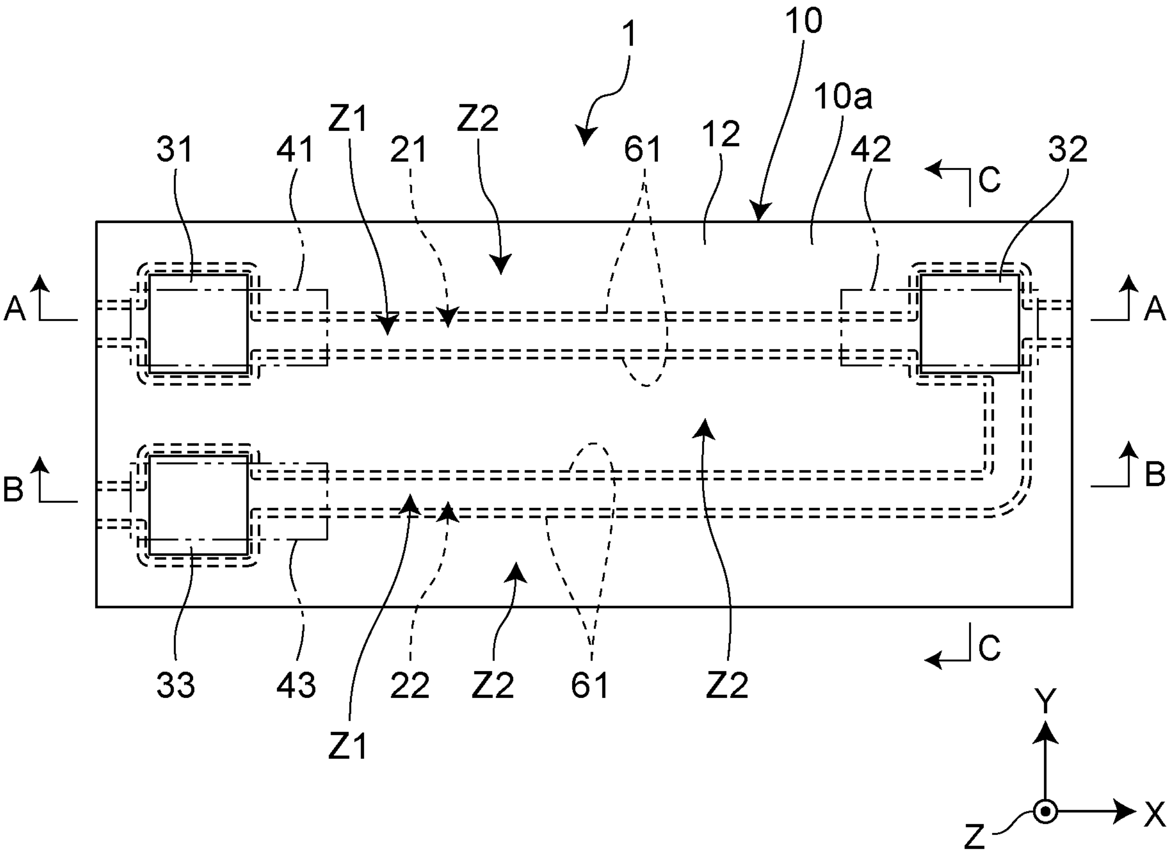
FIG. 1 is a plan view showing a first embodiment of an inductor component.
Figure 2A:
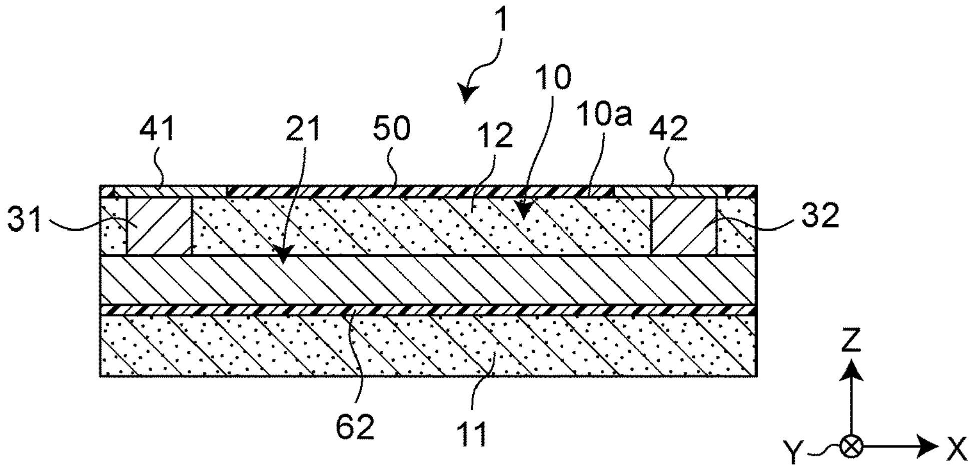
FIG. 2A is a sectional view taken along line A-A of FIG. 1.
Figure 2B:
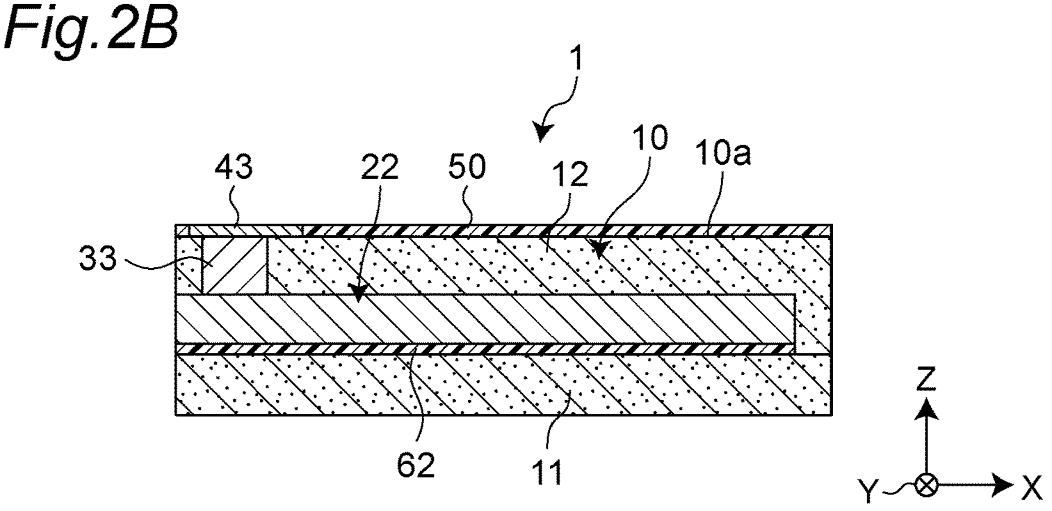
FIG. 2B is a sectional view taken along line B-B of FIG. 1.
Figure 2C:
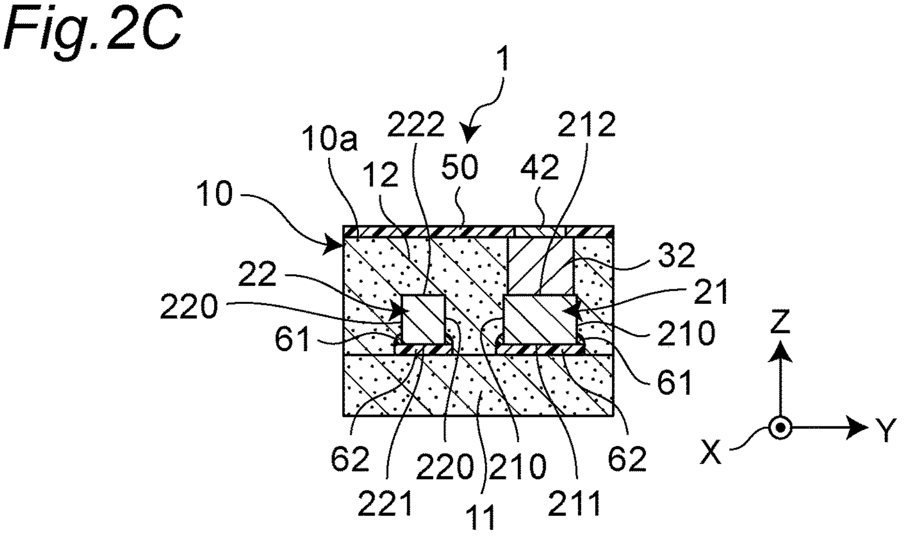
FIG. 2C is a sectional view taken along line C-C of FIG. 1.

FIG. 1 is a plan view showing a first embodiment of the inductor component. FIG. 2A is a sectional view taken along line A-A of FIG. 1. FIG. 2B is a sectional view taken along line B-B of FIG. 1. FIG. 2C is a sectional view taken along line C-C of FIG. 1.

An inductor component 1 is mounted on electronic equipment such as e.g. personal computers, DVD players, digital cameras, TVs, mobile phones, and car electronics, and is e.g. a generally rectangular parallelepiped component. The shape of the inductor component 1 is not particularly limited, but may be a circular cylindrical shape, a polygonal cylindrical shape, a circular frustum shape, or a polygonal frustum shape.

As shown in FIGS. 1, 2A, 2B, and 2C, the inductor component 1 comprises: an element body 10; a first inductor wire 21 and a second inductor wire 22 that are arranged within the element body 10; a side surface insulating part 61 and a bottom surface insulating part 62 that cover a part of the first inductor wire 21 and the second inductor wire 22; a first cylindrical wire 31, a second cylindrical wire 32, and a third cylindrical wire 33 that are embedded in the element body 10 such that their end faces are exposed from a first main surface 10*a* of the element body 10; a first external terminal 41, a second external terminal 42, and a third external terminal 43 that are disposed on the first main surface 10 of the element body 10; and an insulating film 50 disposed on the first main surface 10*a* of the element body 10.

In the figures, the thickness direction of the inductor component 1 is a Z direction, with a forward Z direction being the upper side, a reverse Z direction being the lower side. In a plane orthogonal to the Z direction of the inductor component 1, the length direction of the inductor component 1 is an X direction, and the width direction of the inductor component 1 is a Y direction. For convenience, the insulating film 50 is not shown in FIG. 1.

The element body 10 has a first magnetic layer 11 and a second magnetic layer 12 that are laminated in order along the forward Z direction (that corresponds to "first direction" described in claims). The first magnetic layer 11 and the second magnetic layer 12 each include a flat magnetic powder and a resin containing the magnetic powder. The resin is an organic insulating material including e.g. an epoxy resin, bismaleimide, a liquid crystal polymer, and polyimide. The magnetic powder is e.g. an FeSi alloy such as FeSiCr, an FeCo alloy, an Fe alloy such as NiFe, or an amorphous alloy thereof.

Preferably, the magnetic powder contains 80 wt % or more of Fe and 2 wt % or more of Si and Al. The composition analysis of the magnetic powder is performed using energy dispersion X-ray spectrometry (EDX). An average value from 5 points is calculated with the magnification of 5000 times. According to the above configuration, it is possible by adding Si and Al to reduce the magnetostriction and increase the relative magnetic permeability.

Preferably, in each of the first magnetic layer 11 and the second magnetic layer 12, the filling rate of the magnetic powder is 50 vol % or more and 75 vol % or less (i.e., from 50 vol % to 75 vol %). According to the above configuration, since the filling rate of the magnetic powder is 50 vol % or more, the relative magnetic permeability can be increased with the increased amount of magnetic powder. Since the filling rate of the magnetic powder is 75 vol % or less, electrical connections among a plurality of magnetic powders can be reduced to ensure the insulation property.

Preferably, the first magnetic layer 11 and the second magnetic layer 12 each have a void ratio of 1 vol % or more and 10 vol % or less (i.e., from 1 vol % to 10 vol %). According to the above configuration, since the void ratio is 1 vol % or more, the voids can relieve stress from residual stress and external stress. Since the void ratio is 10 vol % or less, a decrease in inductance and a reduction in strength of the element body can be suppressed.

The first inductor wire 21 and the second inductor wire 22 are arranged on a plane orthogonal to the Z direction between the first magnetic layer 11 and the second magnetic layer 12. Specifically, the first magnetic layer 11 lies in the reverse Z direction of the first inductor wire 21 and the second inductor wire 22, while the second magnetic layer 12 lies in the forward Z direction of the first inductor wire 21 and the second inductor wire 22 and in the direction orthogonal to the forward Z direction.

The first inductor wire 21 extends rectilinearly along the X direction when viewed from the Z direction. The second inductor wire 22 has, when viewed from the Z direction, a portion extending rectilinearly along the X direction and the other portion extending rectilinearly along the Y direction. That is, the second inductor wire 22 extends in an L shape.

It is preferred that the thickness of the first and second inductor wires 21 and 22 be, e.g., 40 μm or more and 120 μm or less (i.e., from 40 μm to 120 μm). In Example of the first and second inductor wires 21 and 22, the thickness is 35 μm, the wire width is 50 μm, and the maximum space between the wires is 200 μm.

The first inductor wire 21 and the second inductor wire 22 are made of a conductive material, e.g. made of a metal material with low electrical resistance, such as Cu, Ag, Au, or Al. In this embodiment, the inductor component 1 comprises only one layer of first and second inductor wires 21 and 22 so that a low profile of the inductor component 1 can be achieved. The inductor wire may have a two-layer structure consisting of a seed layer and an electrolytic plating layer, and may contain Ti or Ni as the seed layer.

A first end of the first inductor wire 21 is electrically connected to the first cylindrical wire 31, and a second end of the first inductor wire 21 is electrically connected to the second cylindrical wire 32. That is, the first inductor wire 21 has at its both ends a pad part with a large wire width where the first inductor wire 21 is directly connected to the first and second cylindrical wires 31 and 32.

A first end of the second inductor wire 22 is electrically connected to the third cylindrical wire 33. That is, the second inductor wire 22 has at the first end a pad part where the second inductor wire 22 is directly connected to the third cylindrical wire 33. A second end of the second inductor wire 22 is connected to the pad part at the second end of the first inductor wire 21 to electrically connect to the second cylindrical wire 32. The first end of the first inductor wire 21 and the first end of the second inductor wire 22 are located on the same side (reverse X direction side) of the element body 10 when viewed from the Z direction.

The first inductor wire 21 includes a first side surface 210 facing a forward Y direction, a second side surface 210 facing a reverse Y direction, a bottom surface 211 facing the reverse Z direction, and a top surface 212 facing the forward Z direction. The first side surface 210 need not completely face the forward Y direction and may face the forward Y direction with a slight tilt, that is, the first side surface 210 substantially faces the forward Y direction. Similarly, the second side surface 210 substantially faces the reverse Y direction, the bottom surface 211 substantially faces the reverse Z direction, and the top surface 212 substantially faces the forward Z direction.

Similarly, the second inductor wire 22 includes a first side surface 220 facing the forward Y direction, a second side surface 220 facing the reverse Y direction, a bottom surface 221 facing the reverse Z direction, and a top surface 222 facing the forward Z direction.

A wire further extends from connection positions of the first and second inductor wires 21 and 22 to the first to third cylindrical wires 31 to 33 toward the outside of the element body 10, this wire being exposed to the outside of the element body 10. That is, the first and second inductor wires 21 and 22 have an exposure part that is exposed to the exterior from side surfaces parallel to the lamination direction (Z direction) of the inductor component 1. This wire is a wire connected to a power supply wire when performing additional electrolytic plating after forming the shape of the first and second inductor wires 21 and 22 in the manufacture process of the inductor component 1. Due to this power supply wire, in the state of the inductor substrate before separating the inductor component 1 into individual pieces, additional electrolytic plating can be easily performed to narrow the wire-to-wire distance. The magnetic coupling between the first and second inductor wires 21 and 22 can be enhanced by narrowing the wire-to-wire distance through the additional electrolytic plating.

The first to third cylindrical wires 31 to 33 extend from the inductor wires 21 and 22 in the Z direction to pass through the interior of the second magnetic layer 12. The first cylindrical wire 31 extends upward from the top surface at a first end of the first inductor wire 21, with the end face of the first cylindrical wire 31 being exposed from the first main surface 10*a* (that is also the main surface of the second magnetic layer 12) of the element body 10. The second cylindrical wire 32 extends from the top surface at a second end of the first inductor wire 21, with the end face of the second cylindrical wire 32 being exposed from the first main surface 10*a* of the element body 10. The third cylindrical wire 33 extends from the top surface at a first end of the second inductor wire 22, with the end faces of the third cylindrical wire 33 being exposed from the first main surface 10*a* of the element body 10.

Accordingly, the first cylindrical wire 31, the second cylindrical wire 32, the third cylindrical wire 33 extend rectilinearly in the direction orthogonal to the first main surface 10*a* from the first inductor wire 21 and the second inductor wire 22 up to the end faces exposed from the first main surface 10*a*. This enables the first external terminal 41, the second external terminal 42, and the third external terminal 43 to be connected to the first inductor wire 21 and the second inductor wire 22 in a shorter distance, achieving the low resistance and high inductance. The first to third cylindrical wires 31 to 33 are made of a conductive material, e.g. the same material as that of the inductor wires 21 and 22.

In the case of covering the first and second inductor wires 21 and 22 with an insulating layer made of a non-magnetic material, the first to third cylindrical wires 31 to 33 may be electrically connected to the first and second inductor wires 21 and 22 via a via conductor passing through the insulating layer. The via conductor is a conductor whose wire width (diameter, cross-sectional area) is smaller than that of the cylindrical wires.

The first to third external terminals 41 to 43 are disposed on the first main surface 10*a* of the element body 10. The first to third external terminals 41 to 43 are made of conductive materials and have a three-layer structure in which for example, Cu with low electrical resistance and excellent stress resistance, Ni with excellent corrosion resistance, and Au with excellent solder wettability and reliability are layered in the mentioned order from the inside toward the outside.

The first external terminal 41 is in contact with the end face of the first cylindrical wire 31 that is exposed from the first main surface 10*a* of the element body 10, to be electrically connected to the first cylindrical wire 31. This allows the first external terminal 41 to be electrically connected to the first end of the first inductor wire 21. The second external terminal 42 is in contact with the end face of the second cylindrical wire 32 that is exposed from the first main surface 10*a* of the element body 10, to be electrically connected to the second cylindrical wire 32. This allows the second external terminal 42 to be electrically connected to the second end of the first inductor wire 21 and to the second end of the second inductor wire 22. The third external terminal 43 is in contact with the end face of the third cylindrical wire 33 and is electrically connected to the third cylindrical wire 33, for the electrical connection to the first end of the second inductor wire 22.

The insulating film 50 is disposed on a portion of the first main surface 10*a* of the element body 10 where the first to third external terminals 41 to 43 are absent. The insulating film 50 may overlap with the first to third external terminals 41 to 43 by allowing the ends of the first to third external terminals 41 to 43 to ride on the insulating film 50. The insulating film 50 is made of e.g. a resin material with high electrical insulation property such as acrylic resin, epoxy resin, and polyimide. This enables the insulation property among the first to third external terminals 41 to 43 to be improved. The insulating film 50 can be used as a mask when forming a pattern of the first to third external terminals 41 to 43, improving manufacturing efficiency. In the case that magnetic powder is exposed from resin, the insulating film 50 covers the exposed magnetic powder, thereby making it possible to prevent the exposer of the magnetic powder to the exterior. The insulating film 50 may contain a filler made of an insulating material.

The side surface insulating part 61 covers only a part of each of the two side surfaces 210 of the first inductor wire 21. The side surface insulating part 61 covers only a part of each of the two side surfaces 220 of the second inductor wire 22. The bottom surface insulating part 62 covers the bottom surface 211 of the first inductor wire 21. The bottom surface insulating part 62 covers the bottom surface 221 of the second inductor wire 22.

Figure 3:
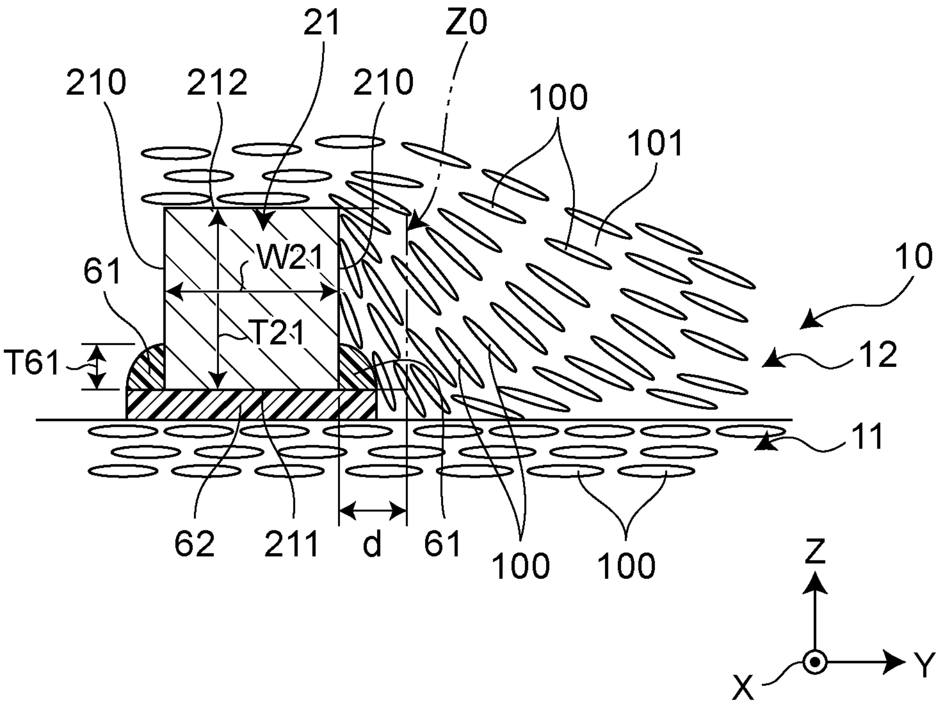
FIG. 3 is a simplified sectional view that is orthogonal to a direction in which a first inductor wire extends.
Figure 4:
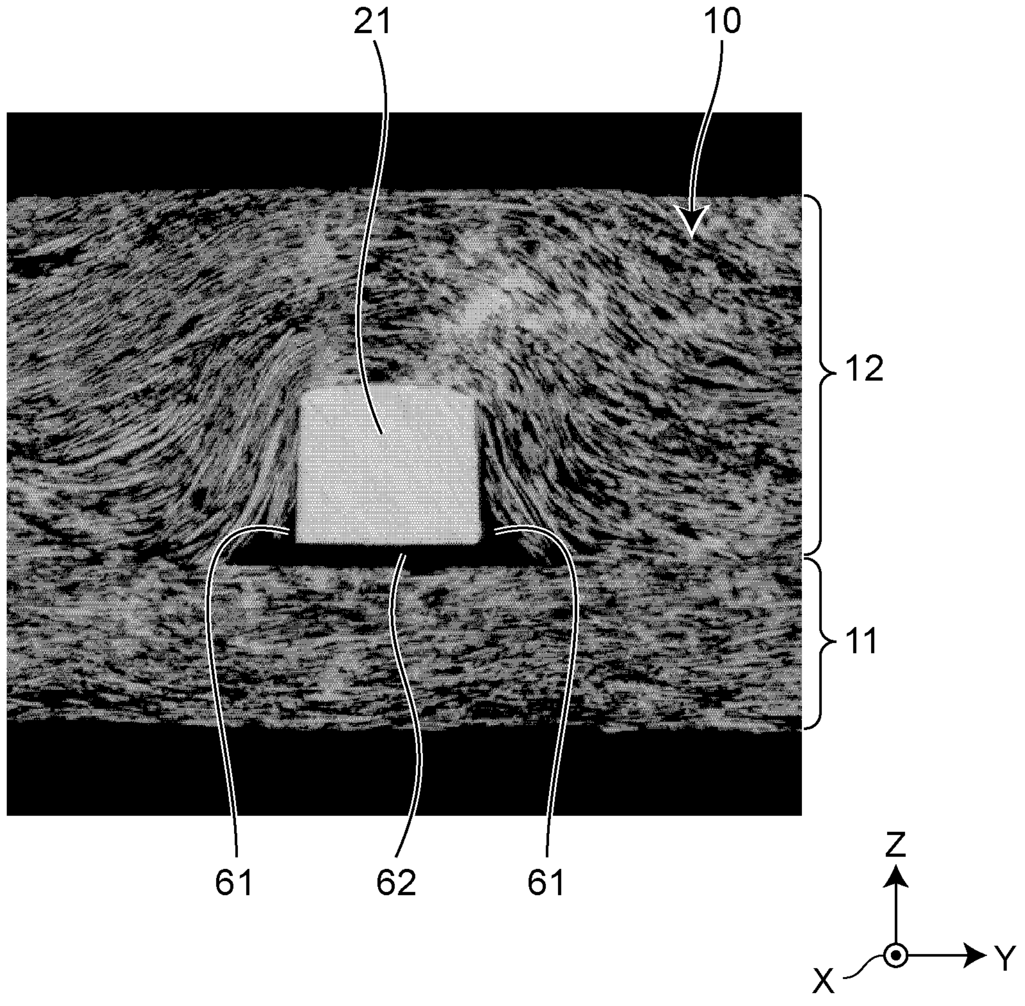
FIG. 4 is an image view corresponding to FIG. 3.

FIG. 3 is a simplified sectional view that is orthogonal to a direction in which the first inductor wire 21 extends, at the center of the first inductor wire 21 in the direction where it extends. FIG. 4 is an image view corresponding to FIG. 3. In FIG. 3, for convenience, the left side of the first inductor wire 21 is not shown, but is similar to the right side of the first inductor wire 21. The same applies to a sectional view around the second inductor wire 22, description of which will be omitted.

As shown in FIGS. 3 and 4, the first magnetic layer 11 and the second magnetic layer 12 include a flat magnetic powder 100 and a resin 101 containing the magnetic powder 100. In FIG. 3, for convenience, the magnetic powder 100 and the resin 101 are not hatched. In FIG. 4, the magnetic powder 100 is indicated as a white line. For example, the flat magnetic powder 100 may be a plate-like flat powder whose main surface is in the shape of circle, ellipse, polygon, etc. in 3D or may be a needle-like flat powder. The outer surface of the magnetic powder 100 may be smooth or may be uneven.

According to the above configuration, since the first magnetic layer 11 and the second magnetic layer 12 include the flat-shaped magnetic powder 100, a high relative magnetic permeability can be obtained due to lowered demagnetic field. Since the first inductor wire 21 is arranged between the first magnetic layer 11 and the second magnetic layer 12, the flat-shaped magnetic powder 100 can be arranged around the first inductor wire 21. This improves the filling rate of the flat magnetic powder 100 to enable improvement in the magnetic permeability around the first inductor wire 21, achieving improvement in the inductance acquisition efficiency.

The side surface insulating part 61 is in contact with only a part of the side surfaces 210 of the first inductor wire 21. According to this, for example, even though a plurality of magnetic powders 100 are electrically coupled in the Y direction, a part of the side surfaces 210 of the first inductor wire 21 is not in contact with the magnetic powders 100 due to the side surface insulating part 61. As a result, the insulation property can be ensured.

The side surface insulating part 61 is made of the same material as that of the resin 101 of the second magnetic layer 12. According to this, the residual stress in the element body 10 can be reduced. Although as shown in FIG. 3, the side surface insulating part 61 has an interface between the side surface insulating part 61 and the resin 101, the side surface insulating part 61 need not have an interface between the side surface insulating part 61 and the second magnetic layer 12. That is, the side surface insulating part 61 may be continuously integrated with the resin 101 of the second magnetic layer 12.

A part of the first inductor wire 21 is in contact with the magnetic powder 100. According to this, by eliminating unnecessary insulating parts, the inductance acquisition efficiency can be improved.

The bottom surface insulating part 62 is in contact with the bottom surface 211 of the first inductor wire 21. According to this, the bottom surface 211 of the first inductor wire 21 is not in contact with the magnetic powder 100 of the first magnetic layer 11 due to the bottom surface insulating part 62. Therefore, the insulation property can be improved.

The side surface insulating part 61 is in contact with the bottom surface insulating part 62. That is, the side surface insulating part 61 is in contact with a portion of the side surface 210 that is close to the bottom surface 211. According to this, the corner between the side surface 210 and the bottom surface 211 of the first inductor wire 21 can be covered with the side surface insulating part 61 and the bottom surface insulating part 62, enabling the insulation property to be further improved. That is, in the first magnetic layer 11, the longitudinal axis (longitudinal axis L shown in FIG. 5) of the magnetic powder 100 is arranged substantially parallel to the bottom surface 211 of the first inductor wire 21, whereby even though the plurality of magnetic powders 100 are electrically coupled in the Y direction, the corner of the first inductor wire 21 is not in contact with the magnetic powders 100 due to the side surface insulating part 61 and the bottom surface insulating part 62.

The composition of the side surface insulating part 61 differs from the composition of the bottom surface insulating part 62. For example, the resin of the side surface insulating part 61 differs from the resin of the bottom surface insulating part 62. This allows the design range of the side surface insulating part 61 and the bottom surface insulating part 62 to widen. For example, by selecting for the bottom surface insulating part 62 a resin with high intimate adhesion to the first inductor wire 21, the reliability of the inductor component 1 can be enhanced. By selecting for the side surface insulating part 61 a resin with stress-relieving properties (e.g. coefficient of thermal expansion and Young's modulus), the overall residual stress of the inductor component 1 can be relieved.

A height T61 of the side surface insulating part 61 in the Z direction is one-half or less of a height T21 of the first inductor wire 21 in the Z direction. Preferably, the height T61 is one-third or less of the height T21. The heights T61 and T21 are values obtained by measurement in a section orthogonal to the direction where the first inductor wire 21 extends. According to this, by reducing the height of the side surface insulating part 61, the volume of the second magnetic layer 12 is increased, further improving the inductance acquisition efficiency while ensuring the insulation property.

Figure 5:
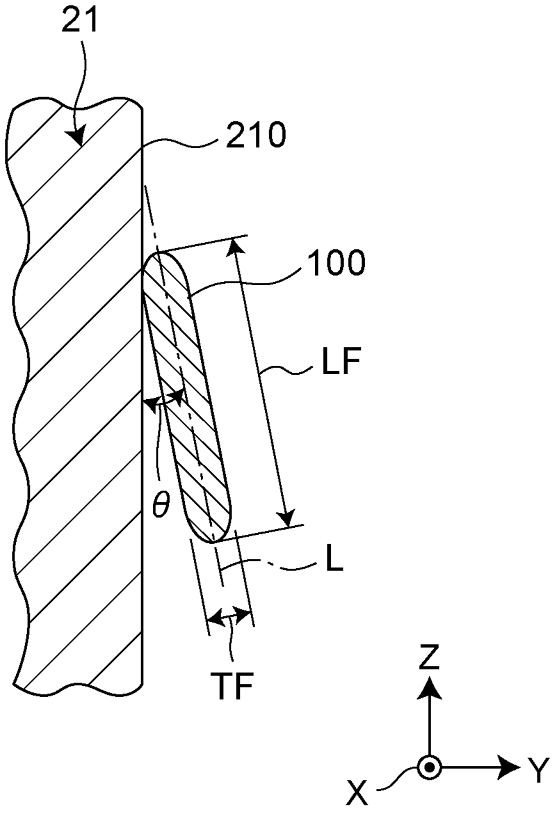
FIG. 5 is a partial enlarged view of FIG. 3.

FIG. 5 is a partial enlarged view of FIG. 3. As shown in FIGS. 3 and 5, in a section (YZ section in this embodiment) orthogonal to the direction where the first inductor wire 21 extends, the second magnetic layer 12 has a side surface vicinity region Z0 defined by the side surface 210 of the first inductor wire 21 and a position apart from the side surface 210 by a determined distance d in the Y direction.

Specifically, the side surface vicinity region Z0 is a region surrounded, in the YZ section, by the side surface 210, the position apart from the side surface 210 by the predetermined distance d, an extended surface including the top surface 212, and an extended surface including the bottom surface 211. The distance from the side surface 210 of the first inductor wire 21 is a distance from the end toward the bottom surface 211 of the side surface 210 of the first inductor wire 21. The predetermined distance is one-third of a width W21 of the first inductor wire 21 in the Y direction.

An angle θ formed by the longitudinal axis L of the flat magnetic powder 100 included in the side surface vicinity region Z0 with respect to the side surface 210 is 45° or less. The longitudinal axis L of the magnetic powder 100 is a straight line passing through the longest portion of the magnetic powder 100 in the YZ section. The angle θ refers to an angle toward the bottom surface 211, not toward the top surface 212, of angles formed between the longitudinal axis L and the side surface 210.

Figure 6:
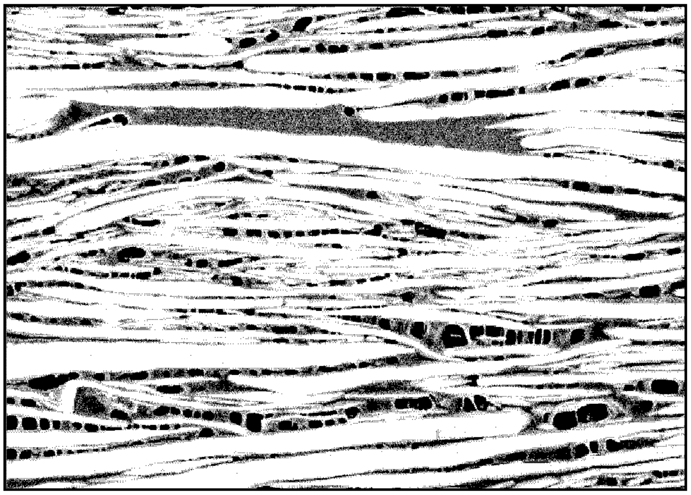
FIG. 6 is an enlarged image view in a section orthogonal to the extended direction of the first inductor wire.

A derivation method of the angle θ includes, as shown in FIG. 6: acquiring an SEM image in a section orthogonal to an extended direction of the first inductor wire 21 at the center in the extended direction; binarizing the SEM image; and measuring and deriving an angle at which the longitudinal axis L of the magnetic powder and the side surface 210 of the first inductor wire 21 intersect, with white and black representing the magnetic powder and the resin, respectively. The angle θ of the magnetic powder 100 angularly spaced apart from the side surface 210 is obtained from an angle at which the side surface 210 and a straight line extended from the longitudinal axis L of the magnetic powder 100 intersect. FIG. 6 is merely a specific example of binarization, showing an SEM image of the second magnetic layer at a position apart from the inductor wire.

According to the above configuration, since the angle θ is 45° or less, the longitudinal axis L of the magnetic powder 100 is arranged substantially parallel to the side surface 210 of the first inductor wire 21 in the side surface vicinity region Z0. For this reason, the magnetic powder 100 and the resin 101 are alternately arranged along the Y direction in the side surface vicinity region Z0, making it possible to ensure the insulation property while keeping the inductance acquisition efficiency.

In the YZ section, as shown in FIGS. 3 and 4, the angle θ increases according as moving away in the Y direction from the side surface 210 of the first inductor wire 21. Increase in the angle θ refers to that the angle varies from 0° toward 90°.

According to the above configuration, since in the vicinal region of the side surface 210 of the first inductor wire 21, the longitudinal axis L of the magnetic powder 100 is arranged substantially parallel to the side surface 210, the magnetic powder 100 and the resin 101 are alternately arranged along the Y direction, making it possible to ensure the insulation property while keeping the inductance acquisition efficiency.

In the YZ section, the angle θ formed by the longitudinal axis L of the magnetic powder 100 included in the first magnetic layer 11 with respect to the bottom surface 211 is 45° or less.

According to the above configuration, since the angle θ formed by the longitudinal axis L of the magnetic powder 100 with respect to the bottom surface 211 is 45° or less, the longitudinal axis L of the magnetic powder 100 is arranged substantially parallel to the bottom surface 211 of the first inductor wire 21. For this reason, the arrangement of the magnetic powder 100 becomes parallel to the magnetic flux, so that high relative magnetic permeability can be obtained.

When in the section (YZ section in this embodiment) orthogonal to the extended direction of the first inductor wire 21 at the center of the first inductor wire 21 in the extended direction, the maximum ferret length of the magnetic powder 100 is LF and the thickness orthogonal to the maximum ferret length of the magnetic powder 100 is TF, LF/TF≥10 holds, and D90 of the maximum ferret length is 100 μm or less. D90 of the maximum ferret length is found by acquiring the SEM image in the above section in a region of 200 μm×200 μm and by calculating D90.

According to the above configuration, due to LF/TF≥10, the flatness of the magnetic powder 100 can be increased, thereby making it possible to obtain a higher relative magnetic permeability. Since D90 of the maximum ferret length is 100 μm or less, the insulation property can be ensured. For example, if the maximum ferret length is too large, there is a high possibility of a short circuit via the magnetic powder between different inductor wires or between laps of the same inductor wire.

As shown in FIG. 1, when viewing the main surface (first main surface 10*a*) of the second magnetic layer 12 from the direction orthogonal to the main surface of the second magnetic layer 12, the second magnetic layer 12 has an overlapping region Z1 that overlaps with the first and second inductor wires 21 and 22 and a non-overlapping region Z2 that does not overlap with the first and second inductor wires 21 and 22. At least a part of the non-overlapping region Z2 is lower in brightness than the overlapping region Z1. Specifically, portions of the non-overlapping region Z2 along the side surfaces 210 of the first and second inductor wires 21 and 22 have a low brightness.

According to the above configuration, on the main surface of the second magnetic layer 12, the area directly above the overlapping region Z1 looks bright, whereas the area directly above at least a part of the non-overlapping region Z2 looks dark. This makes it possible to confirm that the magnetic powder 100 included in the second magnetic layer 12 is in a desired arrangement when pressure bonding the second magnetic layer 12 to the first and second inductor wires 21 and 22 for manufacture. Specifically, it can be determined that the longitudinal axis of the magnetic powder 100 included in the overlapping region Z1 is arranged substantially parallel to the main surface of the second magnetic layer 12 and that the longitudinal axis of the magnetic powder 100 included in at least a part of the non-overlapping region Z2 is arranged along the direction substantially orthogonal to the main surface of the second magnetic layer 12. That is, since the magnetic powder 100 included in the overlapping region Z1 reflects light, the area directly above the overlapping region Z1 looks bright, whereas since the magnetic powder 100 included in at least a part of the non-overlapping region Z2 does not easily reflect light, the area directly above at least a part of the non-overlapping region Z2 looks dark. Therefore, poor filling of the magnetic powder 100 can be detected non-destructively.

Figure 7:
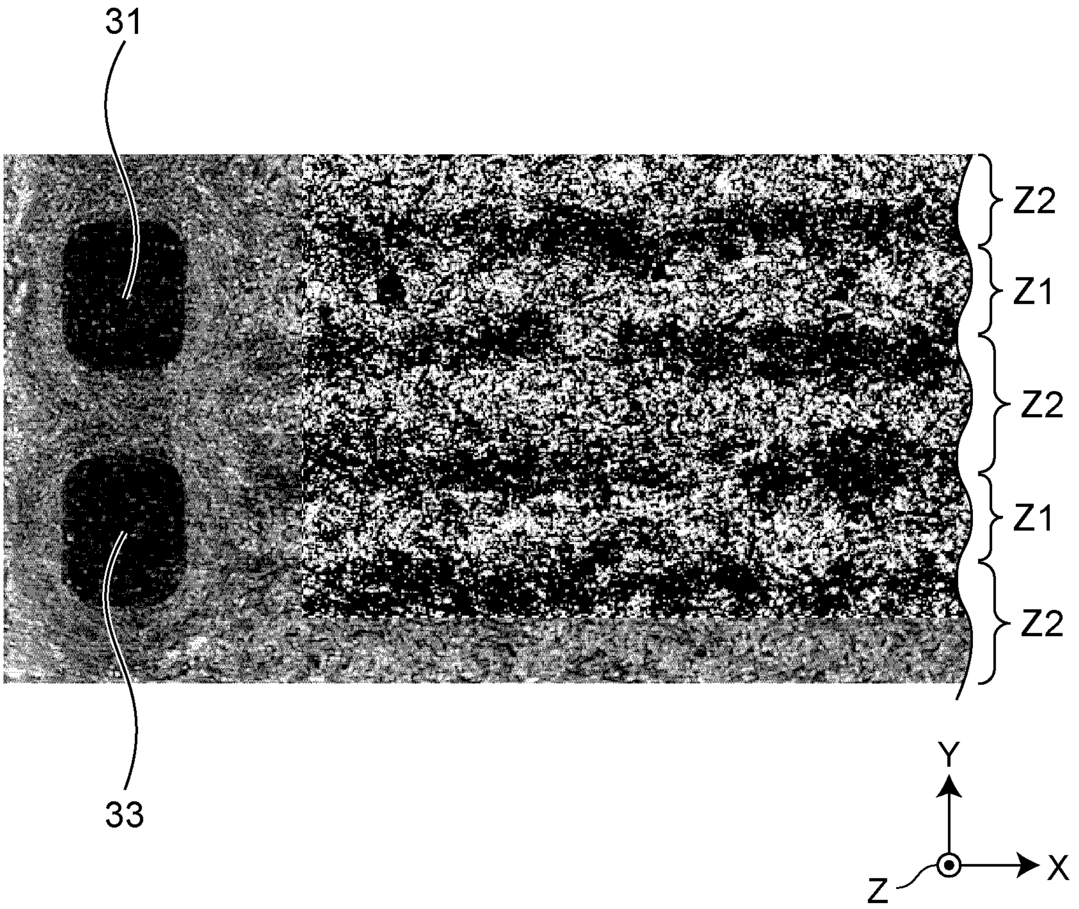
FIG. 7 is an image view, with adjusted brightness, of the inductor component imaged from a plane direction.

A method of discriminating between bright and dark will be described. As shown in FIG. 1, an image is captured from the direction orthogonal to the main surface of the second magnetic layer 12. Specifically, an image is captured with ring lighting using VHX-5000 made by KEYENCE. A predetermined region is then selected in the acquired image, to draw a brightness distribution within the predetermined region. The brightness distribution is set to 255 gradations. Binarization is then performed. The binarization threshold is in the range of approximately half of 255. The image obtained in this manner is shown in FIG. 7. As shown in FIG. 7, the area directly above the overlapping region Z1 looks bright. On the other hand, the area directly above at least a part of the non-overlapping region Z2 looks dark, and in particular, the areas directly above the portions of the non-overlapping region Z2 along the side surfaces 21 of the first and second inductor wires 21 and 22 look dark.

Manufacture Method

A method of manufacturing the inductor component 1 will then be described. FIGS. 8A to 8L correspond to the C-C section (FIG. 2C) of FIG. 1.

Figure 8A:
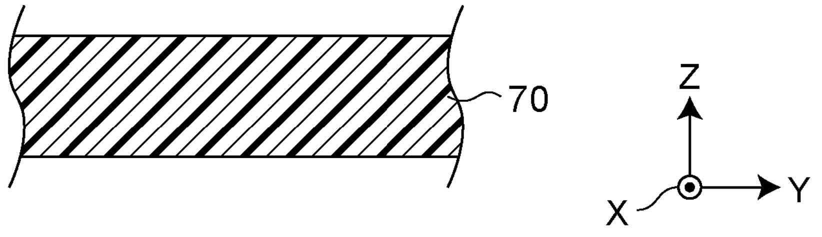
FIG. 8A is an explanatory view explaining a method of manufacturing the inductor component.

As shown in FIG. 8A, a base substrate 70 is prepared. The hardness of the base substrate 70 is higher than the hardness of a magnetic sheet constituting the first magnetic layer 11 and the second magnetic layer 12. The base substrate 70 is made of e.g. an inorganic material such as ceramic, glass, and silicon.

Figure 8B:
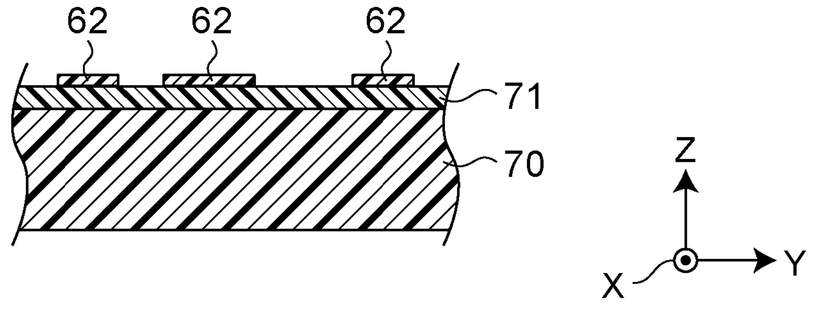
FIG. 8B is an explanatory view explaining the method of manufacturing the inductor component.

As shown in FIG. 8B, a first insulating layer 71 is applied onto a main surface of the base substrate 70, and the first insulating layer 71 is cured. Furthermore, a second insulating layer is applied onto the first insulating layer 71, and a predetermined pattern is formed and cured on the second insulating layer using the photolithography method, thereby forming the bottom surface insulating part 62.

Figure 8C:
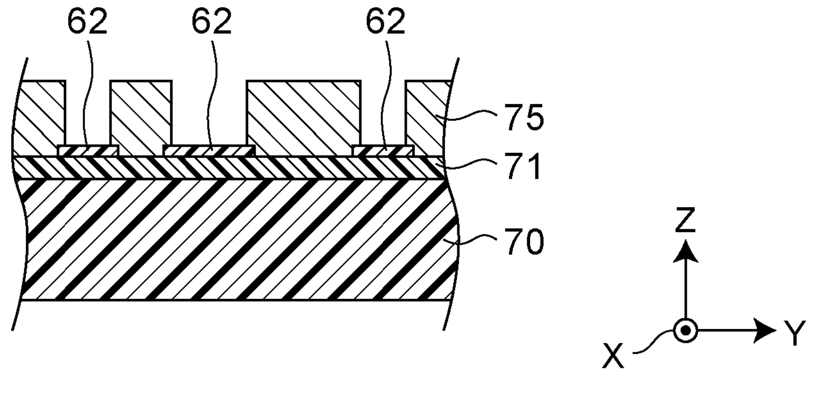
FIG. 8C is an explanatory view explaining the method of manufacturing the inductor component.

As shown in FIG. 8C, a seed layer not shown is formed on the first insulating layer 71 and the bottom surface insulating part 62 by a known method such as sputtering method or thin film deposition method. Afterward, a dry film resist (DFR) 75 is attached and a predetermined pattern is formed on the DFR 75 using the photolithography method. The predetermined pattern is a through hole corresponding to the positions on the bottom surface insulating part 62 where the first inductor wire 21 and the second inductor wire 22 are disposed.

Figure 8D:
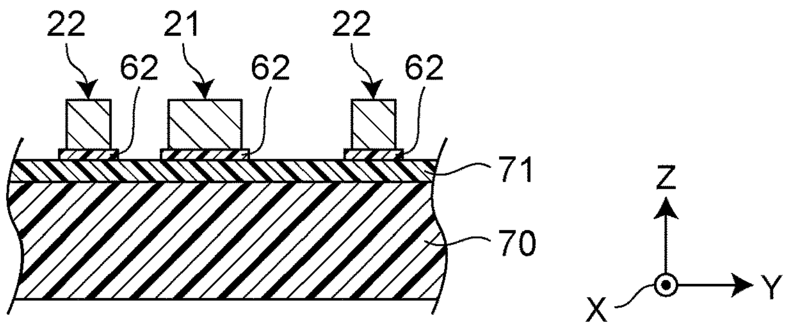
FIG. 8D is an explanatory view explaining the method of manufacturing the inductor component.

As shown in FIG. 8D, the first inductor wire 21 and the second inductor wire 22 are formed on the bottom surface insulating part 62 using electroplating method while feeding the seed layer with electricity. Afterward, the DFR 75 is peeled off and the seed layer is etched. In this manner, the first inductor wire 21 and the second inductor wire 22 are formed on the main surface of the base substrate 70.

Figure 8E:
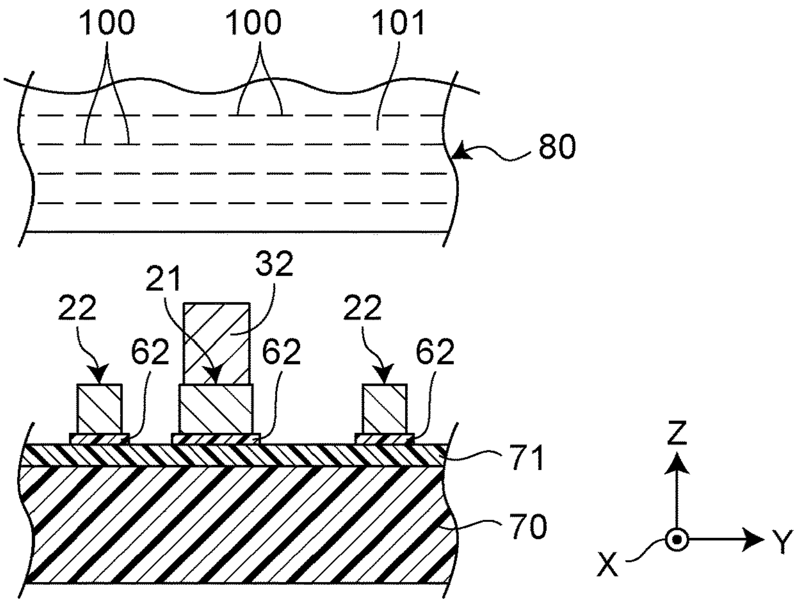
FIG. 8E is an explanatory view explaining the method of manufacturing the inductor component.

Afterward, the DFR 75 is again attached and a predetermined pattern is formed on the DFR 75 using the photolithography method. The predetermined pattern is a through hole corresponding to the positions on the first inductor wire 21 and the second inductor wire 22 where the first cylindrical wire 31, the second cylindrical wire 32, and the third cylindrical wire 33 are disposed. Then, as shown in FIG. 8E, the first cylindrical wire 31, the second cylindrical wire 32, and the third cylindrical wire 33 are formed on the first inductor wire 21 and the second inductor wire 22 using electroplating. Thereafter, the DFR 75 is peeled off. A seed layer may be used for electroplating, and in this case, the seed layer needs to be etched.

The seed layer upon formation of the first inductor wire 21 and the second inductor wire 22 may be left unetched so as to form the first cylindrical wire 31, the second cylindrical wire 32, and the third cylindrical wire 33 by feeding via this seed layer. Also in this case, the seed layer needs to be etched.

Afterward, a magnetic sheet 80 including the flat magnetic powder 100 and the resin 101 containing the magnetic powder 100 is pressure bonded from above the main surface of the base substrate 70 toward the first inductor wire 21 and the second inductor wire 22 such that as shown in FIG. 8 the magnetic sheet 80 covers the top surface 212 and the side surface 210 of the first inductor wire 21 and the top surface 222 and the side surface 220 of the second inductor wire 22. This magnetic sheet 80 constitutes the second magnetic layer 12. At this time, simultaneously, the resin 101 included in the magnetic sheet 80 is extruded from the magnetic sheet 80 so as to cover only a part of the side surfaces 210 of the first inductor wire 21 and only a part of the side surfaces 220 of the second inductor wire 22, to form the side surface insulating part 61. In FIGS. 8E and 8F, the magnetic powder 100 is indicated with its longitudinal axis. In the other drawings, the magnetic powder 100 is not shown.

Figure 8F:
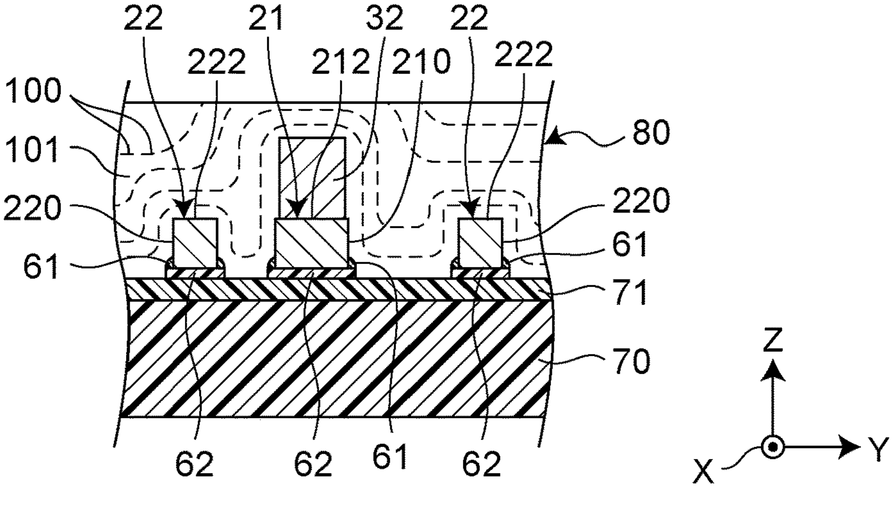
FIG. 8F is an explanatory view explaining the method of manufacturing the inductor component.

That is, as shown in FIG. 8E, the longitudinal axis of the magnetic powder 100 of the magnetic sheet 80 is arranged along the horizontal direction (Y direction), but as shown in FIG. 8F, when pressure bonding the magnetic sheet 80, the longitudinal axis of the magnetic resin 100 of the magnetic sheet 80 is arranged along the direction in which the magnetic sheet 80 deforms by the pressing force from top to bottom. At this time, since the hardness of the base substrate 70 is higher than the hardness of the magnetic sheet 80, when pressure bonding the magnetic sheet 80 to the first inductor wire 21 and the second inductor wire 22, the resin 101 included in the magnetic sheet 80 can be effectively extruded to only a part of the side surfaces 210 of the first inductor wire 21 and to only a part of the side surfaces 220 of the second inductor wire 22. Thus, the side surface insulating part 61 can be effectively formed simultaneously with the pressure bonding of the magnetic sheet 80.

Although in the above, the first insulating layer 71 is disposed, this is not essential. For example, when desired to enlarge the region of the side surface insulating part 61, the size of the side surface insulating part 61 can be adjusted by thinning the thickness of the first insulating layer 71 or by not disposing the first insulating layer 71.

Figure 8G:
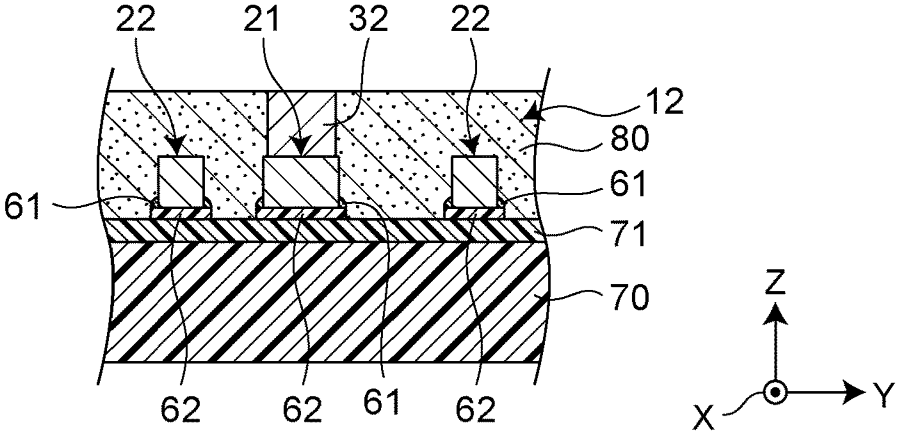
FIG. 8G is an explanatory view explaining the method of manufacturing the inductor component.

Subsequently, as shown in FIG. 8G, the magnetic sheet 80 is polished to form the second magnetic layer 12 and to expose the end faces of the first cylindrical wire 31, the second cylindrical wire 32, and the third cylindrical wire 33.

Figure 8H:
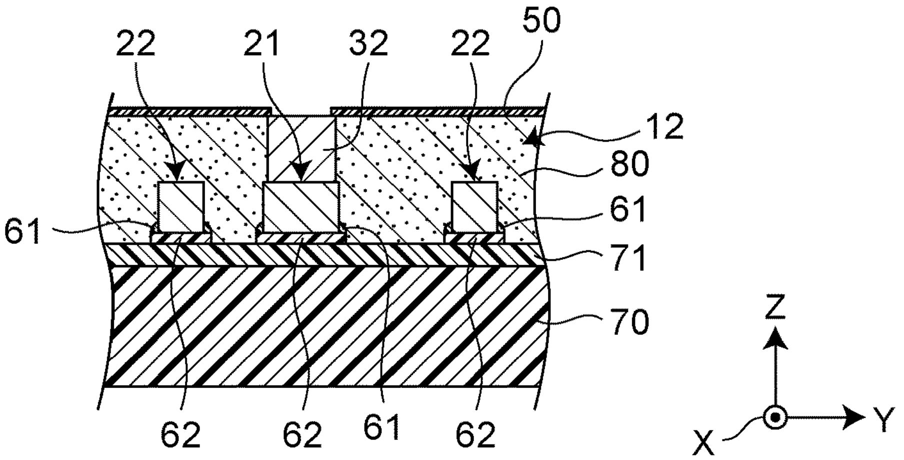
FIG. 8H is an explanatory view explaining the method of manufacturing the inductor component.

Subsequently, as shown in FIG. 8H, a third insulating layer is applied to the upper surface of the second magnetic layer 12 and a predetermined pattern is formed and cured on the third insulating layer using the photolithography method, thereby forming the insulating film 50. The predetermined pattern is a through hole corresponding to the end faces of the cylindrical wires 31 to 33 and the positions on the second magnetic layer 12 where the first external terminal 41, the second external terminal 42, and the third external terminal 43 are disposed.

Figure 8I:
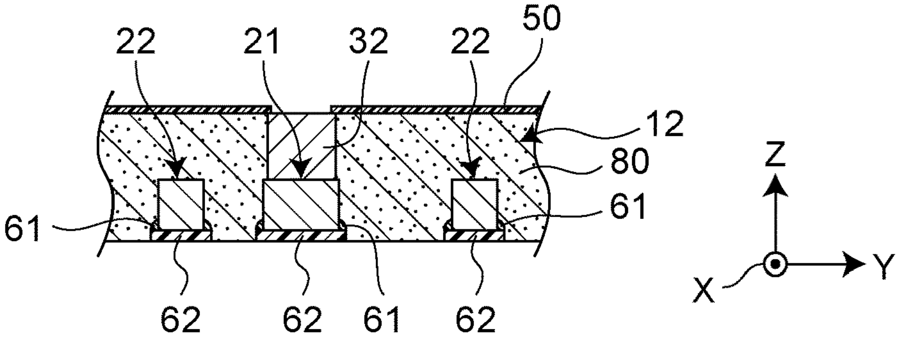
FIG. 8I is an explanatory view explaining the method of manufacturing the inductor component.

Subsequently, as shown in FIG. 8I, the base substrate 70 and the first insulating layer 71 are removed by polishing. At this time, the first insulating layer 71 may be used as a peeling layer so that the base substrate 70 and the first insulating layer 71 are removed by peeling.

Figure 8J:
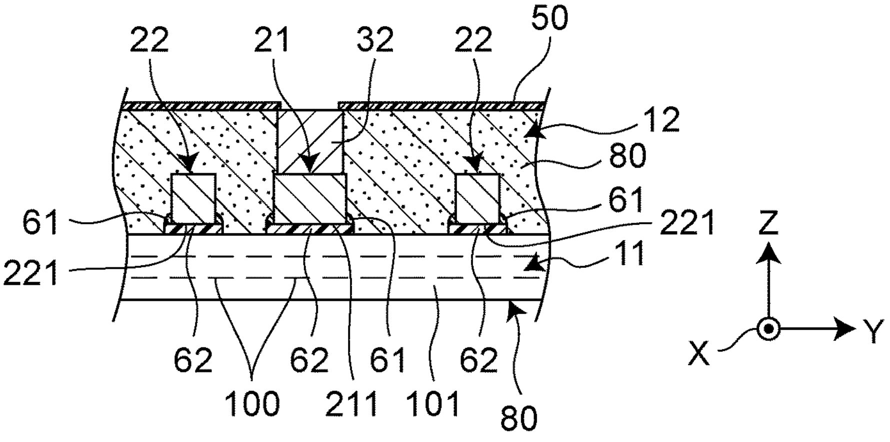
FIG. 8J is an explanatory view explaining the method of manufacturing the inductor component.

Subsequently, as shown in FIG. 8J, another magnetic sheet 80 is pressure bonded to the first inductor wire 21 and the second inductor wire 22 from below the first inductor wire 21 and the second inductor wire 22 such that the another magnetic sheet 80 covers the bottom surface 211 of the first inductor wire 21 and the bottom surface 221 of the second inductor wire 22. The another magnetic sheet 80 is ground to a predetermined thickness to constitute the first magnetic layer 11. In FIG. 8J, the magnetic powder 100 is indicated with its longitudinal axis. In the other drawings, the magnetic powder 100 is not shown. Indication of the magnetic powder 100 with the longitudinal axis is limited to the "another magnetic sheet 80" toward the bottom surface 211, and the magnetic powder is not shown on the magnetic sheet toward the top surface.

Before and after pressure bonding the magnetic sheet 80, the longitudinal axis of the magnetic powder 100 of the magnetic sheet 80 is arranged along the horizontal direction (Y direction). In this manner, the first inductor wire 21 and the second inductor wire 22 can be sandwiched by the upper and lower magnetic sheets 80, enabling improvement in the inductance acquisition efficiency.

Figure 8K:
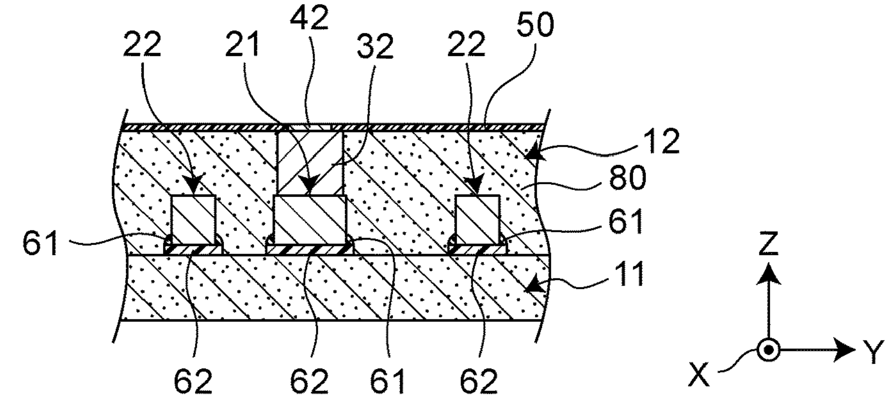
FIG. 8K is an explanatory view explaining the method of manufacturing the inductor component.

Subsequently, as shown in FIG. 8K, a metal film growing from the cylindrical wires 31 to 33 into the through hole of the insulating film 50 is formed by electroless plating, to form the first external terminal 41, the second external terminal 42, and the third external terminal 43.

Figure 8L:
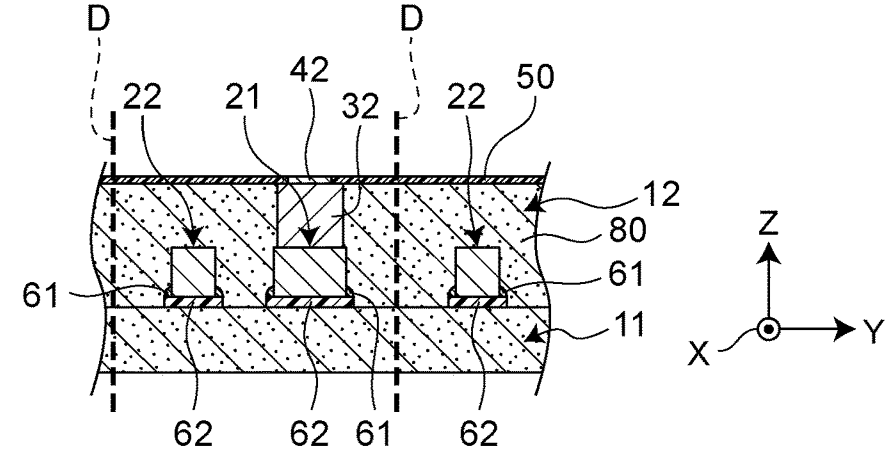
FIG. 8L is an explanatory view explaining the method of manufacturing the inductor component.

Subsequently, as shown in FIG. 8L, the inductor component 1 is separated into individual pieces by a cutting line D, to manufacture the inductor component 1 as shown in FIG. 2C.

Second Embodiment

Figure 9:
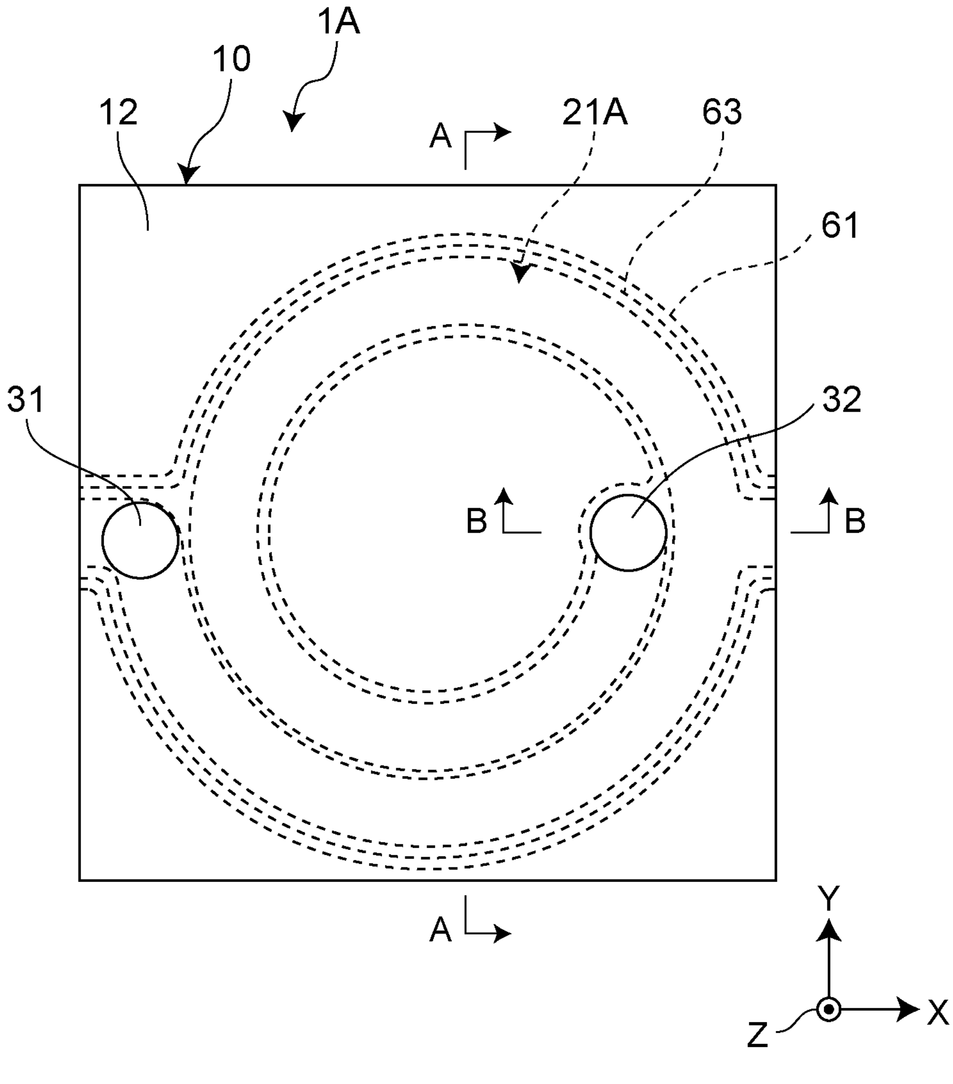
FIG. 9 is a plan view showing a second embodiment of the inductor component.
Figure 10A:
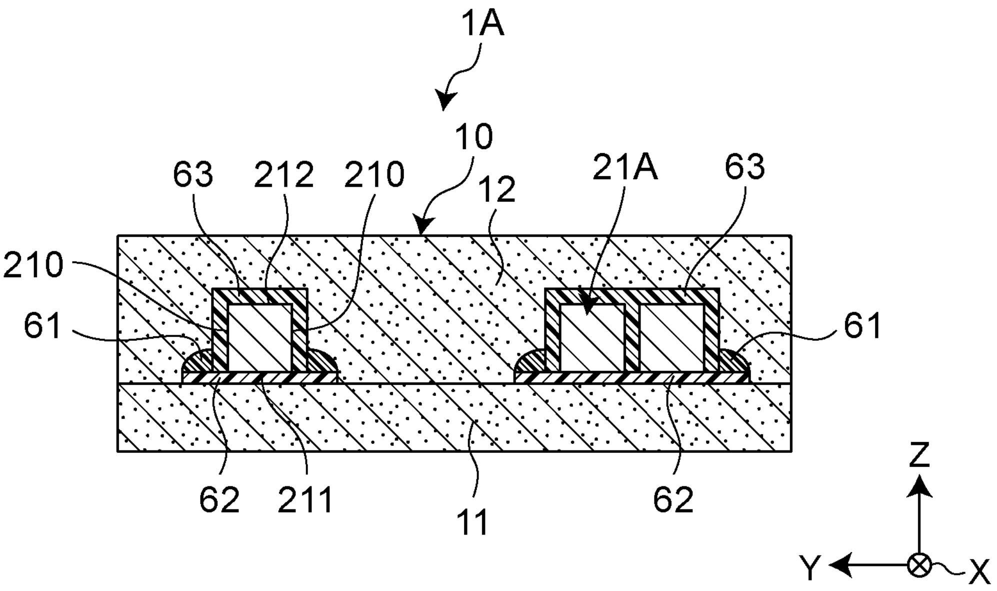
FIG. 10A is a sectional view taken along line A-A of FIG. 9.
Figure 10B:
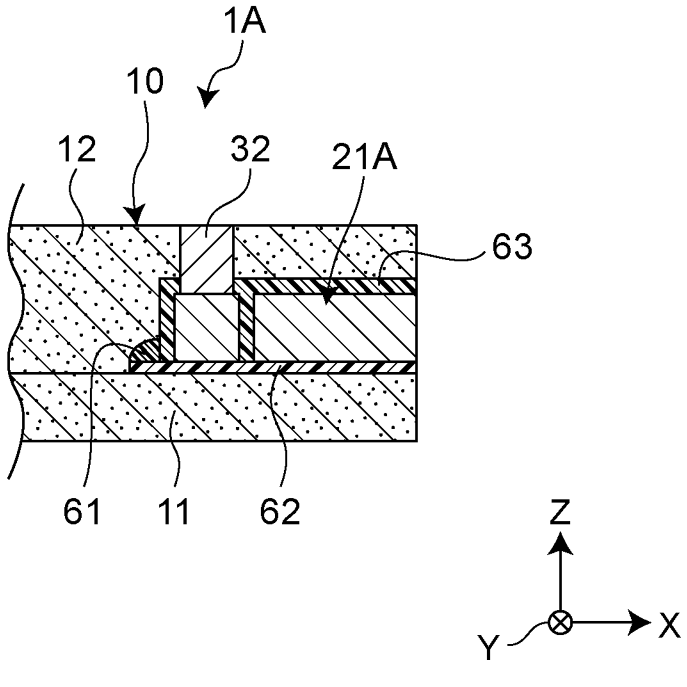
FIG. 10B is a sectional view taken along line B-B of FIG. 9.

FIG. 9 is a plan view showing a second embodiment of the inductor component. FIG. 10A is a sectional view taken along line A-A of FIG. 9. FIG. 10B is a sectional view taken along line B-B of FIG. 9. The second embodiment differs from the first embodiment in the configuration of the inductor wires and insulating part. This different configuration will be described below. The other structures are the same as those of the first embodiment, and therefore they are designated by the same reference numerals as those in the first embodiment and will not again be described.

As shown in FIGS. 9, 10A, and 10B, an inductor component 1A of the second embodiment has an inductor wire 21A. The inductor wire 21A is a wire that is formed only above the first magnetic layer 11, specifically, only on the bottom surface insulating part 62 arranged on the upper surface of the first magnetic layer 11 and that extends in a spiral shape along the upper surface of the first magnetic layer 11. The inductor wire 21A has a spiral shape with more than one lap. When viewed from above, the inductor wire 21A is spirally wound clockwise from the inner peripheral end toward the outer peripheral end. The outer peripheral end of the inductor wire 21A is connected to the first cylindrical wire 31, while the inner peripheral end of the inductor wire 21A is connected to the second cylindrical wire 32. In the figures, the insulating film and the external terminal are not shown.

The inductor component 1A further comprises a peripheral surface insulating part 63 in contact with the side surface 210 and the top surface 212 of the inductor wire 21A. The peripheral surface insulating part 63 lies between the side surface insulating part 61 and a part of the side surface 210 of the inductor wire 21A, with the side surface insulating part 61 cooperating with the peripheral surface insulating part 63 to cover only a part of the side surface 210 of the inductor wire 21A.

The composition of the peripheral surface insulating part 63 differs from the composition of the side surface insulating part 61 and the composition of the bottom surface insulating part 62. For example, the resin of the peripheral surface insulating part 63 differs from the resin of the side surface insulating part 61 and the resin of the bottom surface insulating part 62. This expands the design range of the peripheral surface insulating part 63, the side surface insulating part 61, and the bottom surface insulating part 62.

The thickness of the side surface insulating part 61 is greater than the thickness of the peripheral surface insulating part 63. The thickness refers to a maximum value measured in a section orthogonal to the extended direction of the inductor wire 21A. This further improves the insulation property.

The present disclosure is not limited to the above embodiments, and the design can be changed without departing from the gist of the present disclosure. For example, the respective features of the first and the second embodiments may be variously combined.

Although in the first embodiment, two inductor wires, i.e. the first inductor wire 21 and the second inductor wire 22 are arranged in the element body, one or three or more inductor wires may be arranged. In this case, the number of the external terminals and the number of the cylindrical wires are each four or more.

In the first and the second embodiments, "inductor wire" is one imparting inductance to the inductor component by generating magnetic flux in the magnetic layer when electric current flows, and the structure, shape, material, etc. thereof are not particularly limited. In particular, various known wire shape such as meander wire can be used without being limited to the straight line or curved line (spiral=2D curve) extending on the plane as in the embodiments. The total number of the inductor wires is not limited to one layer, and a multi-layer configuration consisting of two or more layers may be employed. Although the shape of the cylindrical wire is rectangular when viewed from the Z direction, it may be circular, elliptical, or oval.

What is claimed is:

1. An inductor component comprising:

an element body having a first magnetic layer and a second magnetic layer that are laminated in order along a first direction;

an inductor wire arranged on a plane orthogonal to the first direction between the first magnetic layer and the second magnetic layer, the inductor wire including side surfaces facing a direction orthogonal to the first direction;

a bottom surface insulating part that extends into the second magnetic layer and is on a portion of a surface of the first magnetic layer that contacts the second magnetic layer; and a side surface insulating part made of a non-magnetic material covering only a part of the side surfaces of the inductor wire, the first magnetic layer and the second magnetic layer each including a flat magnetic powder and a resin containing the magnetic powder, the first magnetic layer existing in a direction opposite to the first direction with respect to the inductor wire, the second magnetic layer existing in the first direction and in a direction orthogonal to the first direction, the side surface insulating part being made of a material that is the same as that of the resin of the second magnetic layer, the side surface insulating part is in contact with material in the second magnetic layer and is in contact with the part of the side surfaces of the inductor wire, and a portion of the side surfaces of the inductor wire other than the part of the side surfaces of the inductor wire that is covered by the side surface insulating part is in direct contact with the second magnetic layer.

2. The inductor component of claim 1, wherein a part of the inductor wire is in contact with the magnetic powder.

3. The inductor component of claim 1, wherein the inductor wire includes a bottom surface facing the direction opposite to the first direction, and the bottom surface insulating part is in contact with the bottom surface.

4. The inductor component of claim 3, wherein in a section orthogonal to a direction where the inductor wire extends, an angle defined by a longitudinal axis of the flat magnetic powder included in the first magnetic layer with respect to the bottom surface is 45° or less.

5. The inductor component of claim 4, wherein the side surface insulating part is in contact with the bottom surface insulating part.

6. The inductor component of claim 3, wherein the side surface insulating part differs in composition from the bottom surface insulating part.

7. The inductor component of claim 3, wherein the inductor wire includes a top surface facing the first direction, the inductor component further comprising:

a peripheral surface insulating part that is in contact with the side surface and the top surface, wherein the peripheral surface insulating part differs in composition from the side surface insulating part and from the bottom surface insulating part, and wherein the side surface insulating part has a thickness that is greater than that of the peripheral surface insulating part.

8. The inductor component of claim 1, wherein the side surface insulating part has a height in the first direction that is one-half or less of that of the inductor wire.

9. The inductor component of claim 1, wherein in a section orthogonal to a direction where the inductor wire extends, the second magnetic layer has a side surface vicinity region defined by the side surface of the inductor wire and a position apart a predetermined distance from the side surface in a direction orthogonal to the first direction, and an angle defined by a longitudinal axis of the flat magnetic powder included in the side surface vicinity region with respect to the side surface is 45° or less.

10. The inductor component of claim 1, wherein in a section orthogonal to a direction where the inductor wire extends, an angle defined by a longitudinal axis of the flat magnetic powder included in the second magnetic layer with respect to the side surface increases according as moving away from the side surface of the inductor wire in a direction orthogonal to the first direction.

11. The inductor component of claim 1, wherein when a main surface of the second magnetic layer in the first direction is viewed from a direction orthogonal to the main surface of the second magnetic layer, the second magnetic layer has an overlapping region overlapping with the inductor wire and a non-overlapping region not overlapping with the inductor wire, and wherein at least a part of the non-overlapping region is lower in brightness than the overlapping region.

12. The inductor component of claim 1, wherein in a section orthogonal to a direction where the inductor wire extends at a center of the inductor wire in the direction where the inductor wire extends, when a maximum ferrite length of the magnetic powder is LF and a thickness orthogonal to the maximum ferrite length of the magnetic powder is TF, $LF/TF \geq 10$ holds, D90 of the maximum ferrite length being 100 μm or less.

13. The inductor component of claim 1, wherein the first magnetic layer and the second magnetic layer each have a void ratio of from 1 vol % to 10 vol %.

14. The inductor component of claim 2, wherein the inductor wire includes a bottom surface facing the direction opposite to the first direction, and the bottom surface insulating part is in contact with the bottom surface.

15. The inductor component of claim 4, wherein the side surface insulating part differs in composition from the bottom surface insulating part.

16. The inductor component of claim 4, wherein the inductor wire includes a top surface facing the first direction, the inductor component further comprising:

a peripheral surface insulating part that is in contact with the side surface and the top surface, wherein the peripheral surface insulating part differs in composition from the side surface insulating part and from the bottom surface insulating part, and wherein the side surface insulating part has a thickness that is greater than that of the peripheral surface insulating part.

17. The inductor component of claim 2, wherein the side surface insulating part has a height in the first direction that is one-half or less of that of the inductor wire.

18. The inductor component of claim 2, wherein in a section orthogonal to a direction where the inductor wire extends, the second magnetic layer has a side surface vicinity region defined by the side surface of the inductor wire and a position apart a predetermined distance from the side surface in a direction orthogonal to the first direction, and an angle defined by a longitudinal axis of the flat magnetic powder included in the side surface vicinity region with respect to the side surface is 45° or less.

* * * * *